(12) United States Patent
Horbatt et al.

(10) Patent No.: US 10,970,947 B1
(45) Date of Patent: Apr. 6, 2021

(54) SYSTEM AND METHOD TO PROVIDE A REAR WINDOW WIPER USAGE NOTIFICATION

(71) Applicant: GM GLOBAL TECHNOLOGY OPERATIONS LLC, Detroit, MI (US)

(72) Inventors: Kevin R. Horbatt, Milford, MI (US); Brenton J. Bergkoetter, Milford, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 0 days.

(21) Appl. No.: 16/818,006

(22) Filed: Mar. 13, 2020

(51) Int. Cl.
  *G07C 5/08* (2006.01)
  *B60S 1/08* (2006.01)
  *B60R 1/12* (2006.01)

(52) U.S. Cl.
  CPC .......... *G07C 5/0825* (2013.01); *B60S 1/0818* (2013.01); *B60R 1/12* (2013.01); *B60R 2001/1215* (2013.01)

(58) Field of Classification Search
  CPC ........................................................ B60S 1/02
  See application file for complete search history.

(56) References Cited

U.S. PATENT DOCUMENTS

| | | | | |
|---|---|---|---|---|
| 5,729,105 A | * | 3/1998 | Droge | B60S 1/0818 318/483 |
| 2012/0056478 A1 | * | 3/2012 | Omoto | B60L 58/18 307/11 |
| 2019/0337452 A1 | * | 11/2019 | de Almeida | B60Q 9/00 |
| 2019/0337487 A1 | * | 11/2019 | de Almeida | G06T 11/60 |

* cited by examiner

*Primary Examiner* — Nabil H Syed
*Assistant Examiner* — Cal J Eustaquio
(74) *Attorney, Agent, or Firm* — Lorenz & Kopf, LLP (57) ABSTRACT

One general aspect includes a method to provide a rear window wiper notification, the method including: when a rear window wiper is in an active state, via a processor, establishing a time duration; and when the rear window wiper remains in the active state throughout the time duration and after a conclusion of the time duration, via the processor, providing the rear window wiper notification in an interior cabin of a vehicle.

17 Claims, 5 Drawing Sheets

SYSTEM AND METHOD TO PROVIDE A REAR WINDOW WIPER USAGE NOTIFICATION

INTRODUCTION

A rear window wiper is a device used to remove rain, snow, ice, dust particulates, and other debris from a vehicle's rear window, so the vehicle's operator can better see what's happening behind the vehicle. With the adoption of camera-based rearview mirrors, vehicle operators are prone to accidentally leaving the rear wipers activated for far longer than is needed to adequately remove all unwanted objects off the rear window. This can lead to unintentional consequences such as, for example, unnecessary wear and tear or burnout of the rear wiper's actuator and premature wear of the wiper blade. It is therefore desirable to provide a solution that will shorten the activation time of the rear window wiper. One solution would be to provide a notification on the driver information center designed to remind the vehicle operator to deactivate the rear window wiper after it has been left on for too long. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to provide a rear window wiper notification, the method including: when a rear window wiper is in an active state, via a processor, establishing a time duration; and when the rear window wiper remains in the active state throughout the time duration and after a conclusion of the time duration, via the processor, providing the rear window wiper notification in an interior cabin of a vehicle. Other embodiments of this aspect include corresponding computer systems, apparatus, and computer programs recorded on one or more computer storage devices, each configured to perform the actions of the methods.

Implementations may include one or more of the following features. The method where: a front window wiper is in an inactive state; and the time duration is established when both the rear window wiper is in the active state and the front window wiper is in the inactive state. The method further including: where the time duration can be a long time duration or a short time duration; and when a rearview mirror is set to a camera mode, via the processor, selecting the short time duration; otherwise, via the processor, selecting the long time duration. The method further including, when the vehicle has been stationary for a substantial amount of time, via the processor, modifying the time duration. The method further including: sensing, via the processor, substantial rainfall on a portion of the vehicle; and when substantial rainfall is sensed on the portion of the vehicle, via the processor, modifying the time duration. The method where the rear window wiper notification is configured to remind an occupant that the rear window wiper is in the active state. The method where the rear window wiper notification is exhibited on a display of a Driver Information Center (DIC). Implementations of the described techniques may include hardware, a method or process, or computer software on a computer-accessible medium.

One general aspect includes a system to provide a rear window wiper notification, the system includes: a memory configured to include one or more executable instructions and a processor configured to execute the executable instructions, where the executable instructions enable the processor to carry out the following: when a rear window wiper is in an active state, establish a time duration; and when the rear window wiper remains in the active state throughout the time duration and after a conclusion of the time duration, provide the rear window wiper notification in an interior cabin of a vehicle. Other embodiments of this aspect include corresponding computer systems, apparatus, and computer programs recorded on one or more computer storage devices, each configured to perform the actions of the methods.

Implementations may include one or more of the following features. The system where: a front window wiper is in an inactive state; and the time duration is established when both the rear window wiper is in the active state and the front window wiper is in the inactive state. The system where the executable instructions further enable the processor to carry out the following: where the time duration can be a long time duration or a short time duration; and when a rearview mirror is set to a camera mode, select the short time duration; otherwise, select the long time duration. The system where the executable instructions further enable the processor to carry out the following: when the vehicle has been stationary for a substantial amount of time, modify the time duration. The system where the executable instructions further enable the processor to carry out the following: sense substantial rainfall on a portion of the vehicle; and when substantial rainfall is sensed on the portion of the vehicle, modify the time duration. The system where the rear window wiper notification is configured to remind an occupant that the rear window wiper is in the active state. The system where the rear window wiper notification is exhibited on a display of a Driver Information Center (DIC). Implementations of the described techniques may include hardware, a method or process, or computer software on a computer-accessible medium.

One general aspect includes a non-transitory and machine-readable medium having stored thereon executable instructions adapted to provide a rear window wiper notification, which when provided to a processor and executed thereby, causes the processor to carry out the following: when a rear window wiper is in an active state, establish a time duration; and when the rear window wiper remains in the active state throughout the time duration and after a conclusion of the time duration, provide the rear window wiper notification in an interior cabin of a vehicle. Other embodiments of this aspect include corresponding computer systems, apparatus, and computer programs recorded on one or more computer storage devices, each configured to perform the actions of the methods.

Implementations may include one or more of the following features. The non-transitory and machine-readable medium where: a front window wiper is in an inactive state; and the time duration is established when both the rear window wiper is in the active state and the front window wiper is in the inactive state. The non-transitory and machine-readable medium further including the following:

where the time duration can be a long time duration or a short time duration; and when a rearview mirror is set to a camera mode, select the short time duration; otherwise, select the long time duration. The non-transitory and machine-readable medium further including the following: when the vehicle has been stationary for a substantial amount of time, modify the time duration. The non-transitory and machine-readable medium further including the following: sense substantial rainfall on a portion of the vehicle; and when substantial rainfall is sensed on the portion of the vehicle, modify the time duration. The non-transitory and machine-readable medium where the rear window wiper notification is exhibited on a display of a Driver Information Center (DIC). Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
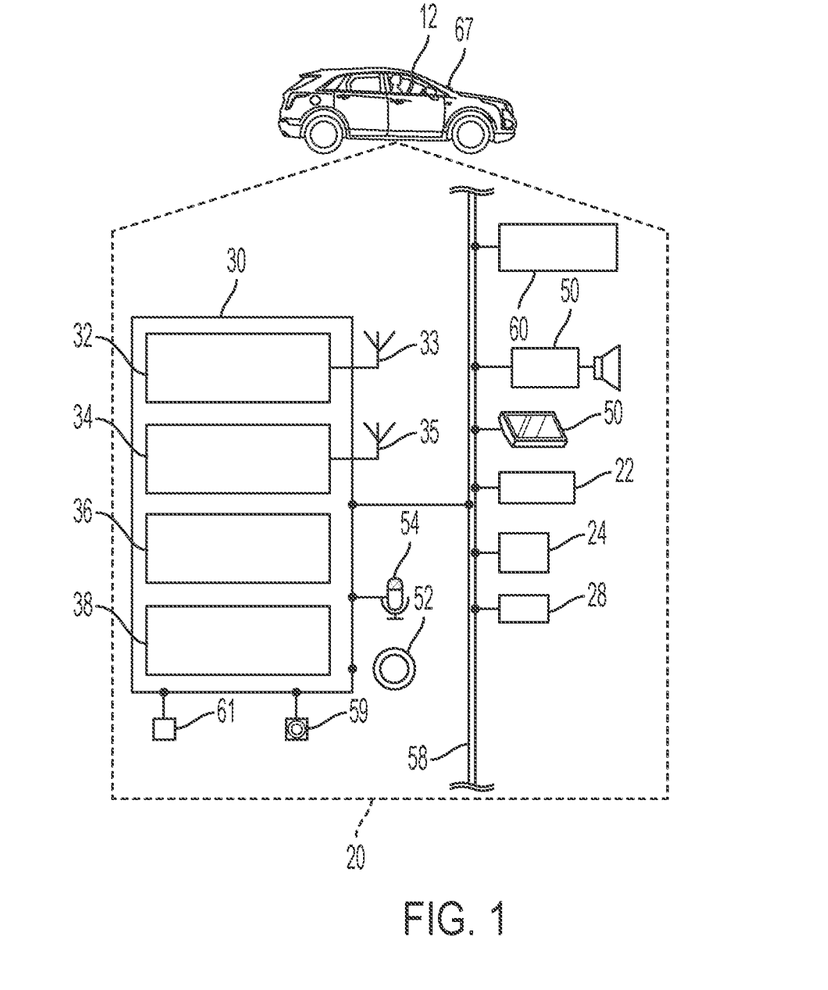
FIG. 1 is a block diagram depicting an exemplary embodiment of an electronics system capable of utilizing the system and method disclosed herein.

With reference to FIG. 1, vehicle 12 is depicted in the illustrated embodiment as a sports utility vehicle (SUV), but it should be appreciated that any other vehicle including motorcycles, trucks, passenger sedan, recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-59, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a remote computer or facility via a land network (not shown) and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from a constellation of GNSS (or BDS) satellites. The GNSS received can determine a current vehicle location based on reception of a plurality of GNSS signals from the constellation of GNSS satellites. The vehicle location information can then be communicated to the telematics unit 30, or other VSMs, such as the onboard computer 60. In one embodiment (as shown in FIG. 1), the telematics unit 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, controlling an electronic parking brake, power sun/moon roof, the vehicle's head lamps, air conditioning operations, power mirrors, controlling the vehicle primary mover (e.g., engine, primary propulsion system), and/or controlling various other vehicle system modules (VSMs).

Onboard computer 60 can otherwise be known as an electronic control unit (ECU) and controls one or more of the electrical systems or subsystems of vehicle 12. As follows, onboard computer 60 functions as a central vehicle computer that can be used to carry out various vehicle tasks. Also, one or more other VSMs can be incorporated with or controlled by onboard computer 60. These VSMs can include, but are not limited to, the engine control module (ECM), powertrain control module (PCM), transmission control module (TCM), body control module (BCM), brake control module (EBCM), center stack module (CSM), central timing module (CTM), general electronic module (GEM), body control module (BCM), and suspension control module (SCM).

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at a remote call center (e.g., ON-STAR by GM). This enables the vehicle to communicate data or information with remote systems at a remote call center.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as at a remote call center. And, in other embodiments, other protocols can be used for V2V or V2I communications.

The SRWC circuitry 32 enables the telematics unit 30 to transmit and receive SRWC signals, such as BLE signals. The SRWC circuit can allow the telematics unit 30 to connect to another SRWC device (e.g., a smart phone). Additionally, in some embodiments, the telematics unit 30 contains a cellular chip set 34 thereby allowing the device to communicate via one or more cellular protocols, such as those used by a cellular carrier system (not shown), through antenna 35. In such a case, the telematics unit 30 is user equipment (UE) that can be used to in carry out cellular communications via a cellular carrier system (cellular system).

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at a remote call center or server) via packet-switched data communication. This packet switched data communication may be carried out through use of a non-vehicle wireless access point or cellular system that is connected to a land network via a router or modem. When used for packet-switched data communication such as TCP/IP, the telematics unit 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Telematics unit 30 may, via cellular chipset 34, communicate data over a wireless carrier system, for example to and from a third-party computer or server (not shown). In such a scenario, radio transmissions may be used to establish a communications channel, such as a voice channel and/or a data channel, so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, audio system 56, one or more cameras 59, and sensor 61. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the telematics unit 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via a wireless carrier protocol. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. For example, display 50 can be the touch screen of the vehicle's infotainment module at the center console of the vehicle's interior. Various other vehicle-user interfaces can also be utilized, as the interfaces of FIG. 1 are only an example of one particular implementation. In another example, display 50 can be part of the driver information center (DIC) on the dashboard of vehicle 12.

The one or more cameras 59 can be of the digital variety and can capture one or more images (i.e., video feed or image information), which can then be transmitted to telematics unit 30 and processor 36. To name a few locations, the camera(s) 59 can be installed on the rear fascia of the vehicle body, the front fascia of the vehicle body, one or more of the vehicle's side-view mirrors, one or more of the vehicle's A-pillars, or the vehicle's undercarriage. In addition, the one or more cameras 59 can be positioned around the vehicle body to capture a video feed that will assist a vehicle operator in parking vehicle 12.

Sensor 61 can sense when a substantial amount of rainfall has landed on a portion of the exterior body of vehicle 12. For example, sensor 61 can sense when rain is falling on the windshield or rear window of vehicle 12. Skilled artists will see that rain sensors are known in the art (for example, RAINSENSE by General Motors).

Method

Figure 2:
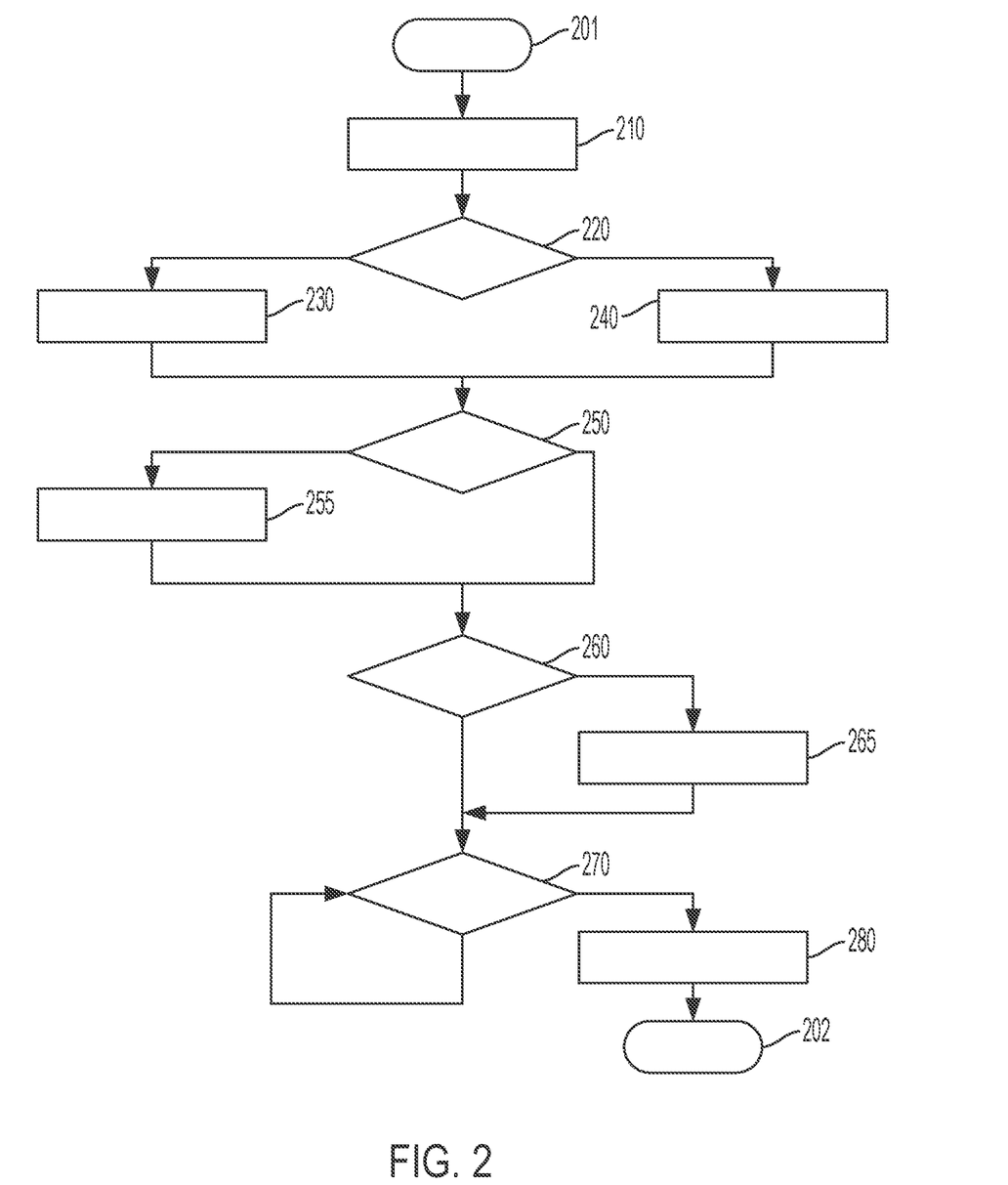
FIG. 2 is an exemplary flow chart for the utilization of exemplary system and method aspects disclosed herein.

Turning now to FIG. 2, there is shown an embodiment of a method 200 to provide a notification that a rear window wiper has been in an active state for a substantial period of time, and thus may need to be deactivated to avoid wiper actuator burnout as well as premature wear of the wiper blade. Skilled artists will also see that one or more aspects of rear window wiper notification method 200 could be carried out by telematics unit 30. For example, in order to carry out the one or more aspects of method 200, memory 38 includes executable instructions stored thereon and processor 36 executes these executable instructions. One or more ancillary aspects of method 200 may also be completed by one or more vehicle devices such as, for example, camera 59, sensor 61, and the GNSS receiver 22.

Figure 3:
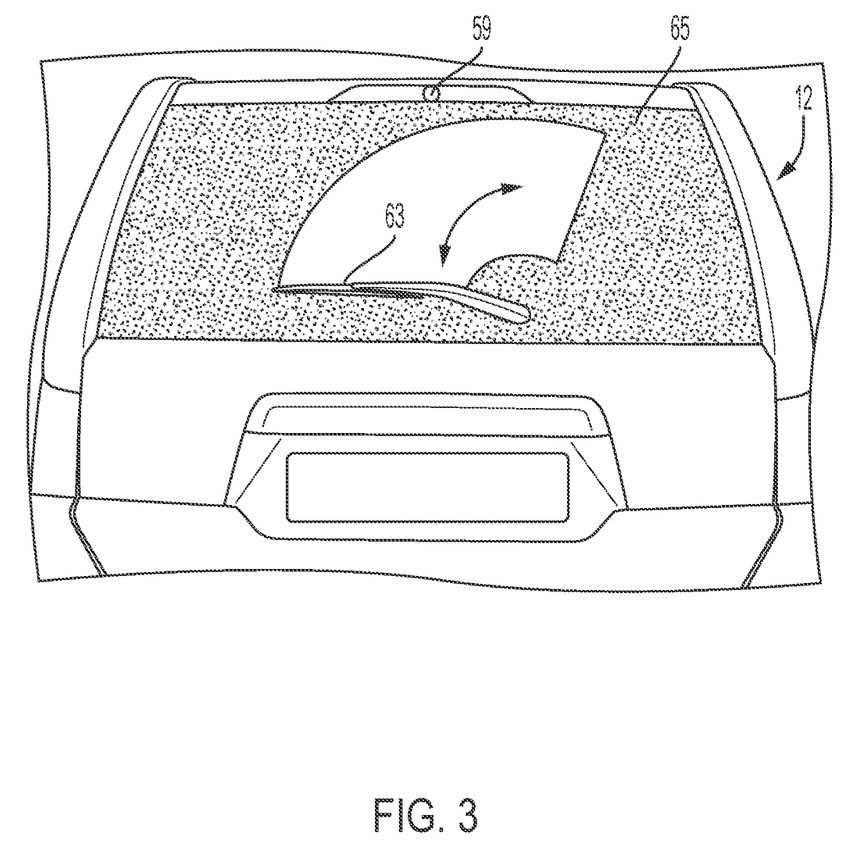
FIG. 3 is an illustrative aspect of the process flow of FIG. 2.

Method 200 begins at 201 in which vehicle 12 has been turned to an ON state (e.g., the vehicle's engine has been turned to an active state). In step 210, as can be seen with additional reference to FIG. 3, the rear window wiper 63 is in an active state. For example, as can be seen, the wiper blade 63 is moving back and forth to remove water or other forms of condensation or debris (or any other unwanted objects) from the exterior surface of the vehicle's rear window 65. Moreover, in this step, the front wiper 67 (FIG. 1) is in an inactive state. In essence, the front wiper 67 is not moving and not removing water or other forms of condensation from the vehicle's windshield.

Figure 4:
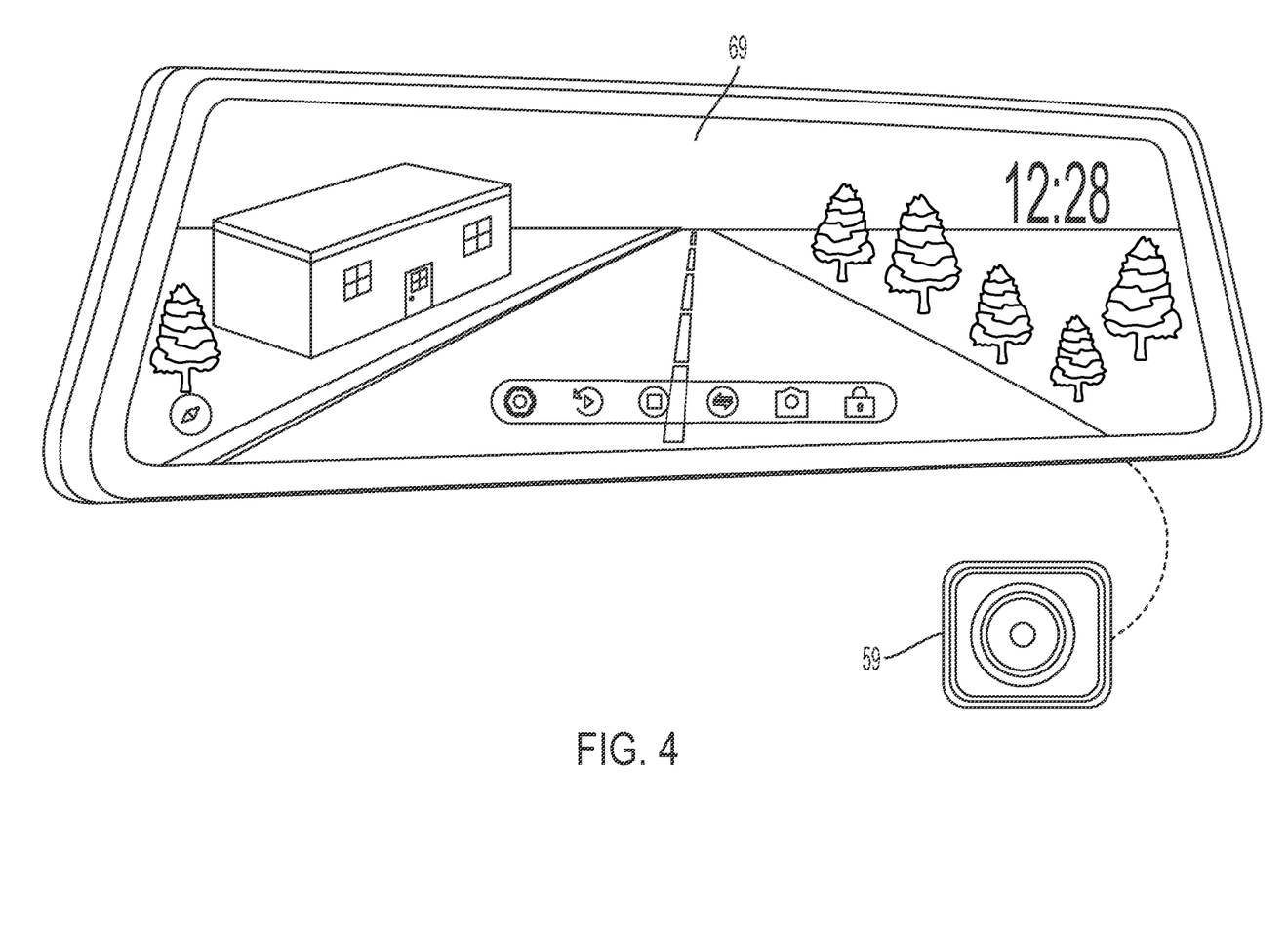
FIG. 4 is an illustrative aspect of the process flow of FIG. 2.

In step 220, with additional reference to FIG. 4, it is determined whether the rearview mirror 69 is in a camera mode. As such, it is determined whether the rearview mirror 69 is displaying one or more images captured from camera 59 or if the mirror 69 is simply reflecting light from its mirror surface. Moreover, when in camera mode, rearview mirror 69 acts as a screen with an electronic display (e.g., similar to touch screen display 50) which can, in certain instance, exhibit information in addition the images captured by camera 59 (e.g., clock information or directional information). When the rearview mirror 69 is in camera mode, method 200 moves to step 230; otherwise, method 200 moves to step 240.

In step 230, a short timer sequence (e.g., a short time duration) is established. The short timer sequence may, for example, be set to a time period of thirty (30) minutes. Moreover, in step 230, the short timer sequence begins to count the time down, and will maintain this count down in an uninterrupted manner, until expiration (when the shorter time duration expires). In step 240, a long timer sequence (e.g., a long time duration) is established. The long timer sequence may, for example, be set to a time period of one (1) hour. Moreover, in step 240, the long timer sequence begins to count the time down, and will maintain this count down in an uninterrupted manner, until expiration (when the longer time duration expires).

In step 250, it will be determined if the vehicle 12 has been stationary for a substantial duration of time. For example, implementing GNSS receiver 22, it will be determined if the vehicle 12 has not moved from its current location for a certain amount time (e.g., eight (8) hours or longer). When the vehicle 12 has not moved for a substantial amount of time, method 200 will move to step 255; otherwise, method 200 will move to step 260. In step 255, the established time duration (either the short timer sequence discussed in step 230 or the long timer sequence discussed in step 240) will be modified. In one or more embodiments, the established time duration will be reduced by a set duration. For example, when the short timer sequence is established, the timer may be reduced by ten (10) minutes. Alternatively, when the long timer sequence is established, the timer may be reduced by twenty (20) minutes. In one or more alternative embodiments, the remainder of the established time duration may be reduced by a certain percentage. For example, the time left on the established timer sequence (short or long) may be reduced by 30% (e.g., reducing four (4) minutes from a timer sequence with twelve (12) minutes remaining).

In step 260, in one or more embodiments, it will be determined if substantial rainfall has landed on the vehicle's exterior. For example, implementing sensor 61, it will be determined if enough rainfall has been sensed on the windshield or rear window to exceed a threshold value (e.g., greater than half an inch of rain landing on the vehicle per each hour or greater than a half an inch of rain landing on the vehicle over a period of two (2) hours). When substantial rainfall has been sensed as having landed on vehicle 12, method 200 will move to step 265; otherwise, method 200 will move to step 270. In step 265, the established time duration (either the short timer sequence discussed in step 230 or the long timer sequence discussed in step 240) will be modified. In one or more embodiments, the established time duration will be extended by a set amount. For example, when the short timer sequence is established, the timer may be extended by an additional thirty (30) minutes (i.e., twice as long). Alternatively, when the long timer sequence is established, the timer may be extended by 45 minutes. In one or more alternative embodiments, the established time duration may be extended by a certain percentage. For example, the established timer sequence (short or long) may be extended by 50% (e.g., adding thirty (30) minutes onto the long timer sequence).

In one or more alternative embodiments of step 260, it will be determined if the rear wiper has sprayed water onto the rear window 65. For example, implementing a spray nozzle embedded within the rear wiper, the rear wiper 63 will clean off the exterior surface of the rear window or at least the portions of the window that are in contact with the wiper blade. When the rear wiper sprayer has been activated, method 200 will move to step 265 (discussed above); otherwise, method 200 will move to step 270 (discussed above).

Figure 5:
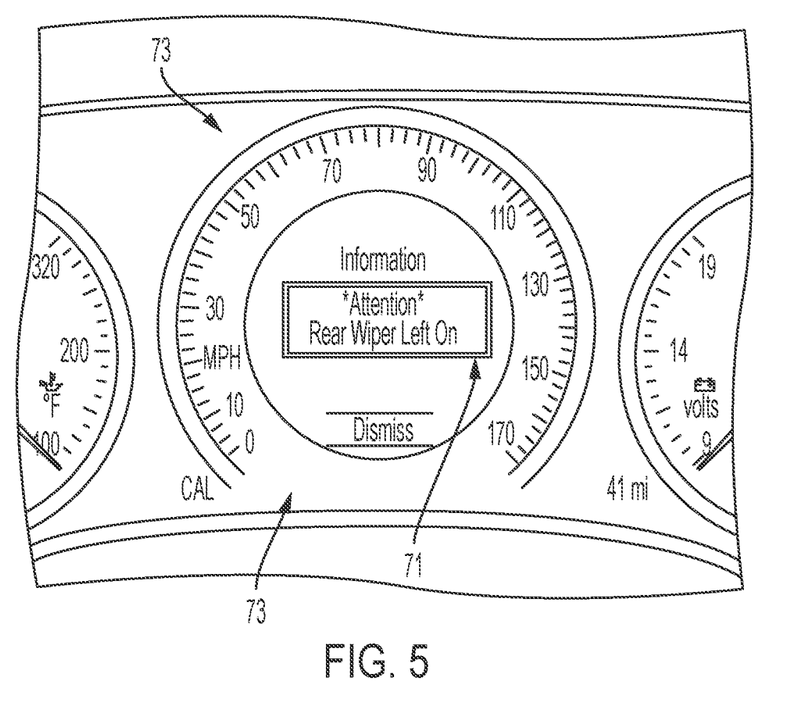
FIG. 5 is another illustrative aspect of the process flow of FIG. 2.

In step 270, it will be determined if the timer sequence has concluded (if the timer has run down to having no time remaining). If the established short or long timer sequence has run out of time, method 200 will move to step 280; otherwise, method 200 will return to the beginning of this step 270 and thus continuously monitor the timer sequence (until, at least, the remaining time runs out). In step 280, with additional reference to FIG. 5, a rear window wiper notification 71 may be exhibited on the DIC 73. As shown, in one or more embodiments, notification 71 is presented within the confines of the vehicle's digital speedometer so that it can be easily spotted by the vehicle's operator. Moreover, as can be seen, notification 71 is designed to inform the vehicle operator (or other vehicle passengers) that the rear window wiper 63 is in the active state, as well as imply that the wiper may have been left in the active state longer than originally desired. It should be understood, however, that the notification 71 can be designed to explicitly instruct the vehicle's operator to deactivate the rear wiper 63 or risk wiper motor burnout, premature wear of the wiper blade, or the like. In one or more embodiments, visual notification 71 may be accompanied by a separate audio notification via audio system 50 (e.g., one or more chime alerts). Skilled artists will understand that the notification may be presented on one or more alternative displays 50 throughout the vehicle's interior (e.g., the infotainment unit display or via the rear view mirror in camera mode). Skilled artists will also see that the rear window wiper notification 71 may simply be an audio alert provided by audio system 50. After step 280, method 200 will move to completion 202.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to provide a rear window wiper notification, the method comprising:
   when a rear window wiper is in an active state, via a processor, establishing a time duration wherein the time duration is one of a long time duration and a short time duration;
   when a rearview mirror is set to a camera mode, via the processor, selecting the short time duration; otherwise, via the processor, selecting the long time duration; and
   when the rear window wiper remains in the active state throughout the time duration and after a conclusion of the time duration, via the processor, providing the rear window wiper notification in an interior cabin of a vehicle.

2. The method of claim 1, wherein:
   a front window wiper is in an inactive state; and
   the time duration is established when both the rear window wiper is in the active state and the front window wiper is in the inactive state.

3. The method of claim 1, further comprising, when the vehicle has been stationary for a substantial amount of time, via the processor, modifying the time duration.

4. The method of claim 1, further comprising:
   sensing, via the processor, substantial rainfall on a portion of the vehicle; and
   when substantial rainfall is sensed on the portion of the vehicle, via the processor, modifying the time duration.

5. The method of claim 1, wherein the rear window wiper notification is configured to remind an occupant that the rear window wiper is in the active state.

6. The method of claim 1, wherein the rear window wiper notification is exhibited on a display of a Driver Information Center (DIC).

7. A system to provide a rear window wiper notification, the system comprises:
   a memory configured to comprise one or more executable instructions and a processor configured to execute the executable instructions, wherein the executable instructions enable the processor to carry out the following:
   when a rear window wiper is in an active state, establish a time duration wherein the time duration is one of a long time duration and a short time duration;
   when a rearview mirror is set to a camera mode, select the short time duration; otherwise, select the long time duration; and
   when the rear window wiper remains in the active state throughout the time duration and after a conclusion of the time duration, provide the rear window wiper notification in an interior cabin of a vehicle.

8. The system of claim 7, wherein:
   a front window wiper is in an inactive state; and
   the time duration is established when both the rear window wiper is in the active state and the front window wiper is in the inactive state.

9. The system of claim 7, wherein the executable instructions further enable the processor to carry out the following: when the vehicle has been stationary for a substantial amount of time, modify the time duration.

10. The system of claim 7, wherein the executable instructions further enable the processor to carry out the following:
    sense substantial rainfall on a portion of the vehicle; and
    when substantial rainfall is sensed on the portion of the vehicle, modify the time duration.

11. The system of claim 7, wherein the rear window wiper notification is configured to remind an occupant that the rear window wiper is in the active state.

12. The system of claim 7, wherein the rear window wiper notification is exhibited on a display of a Driver Information Center (DIC).

13. A non-transitory and machine-readable medium having stored thereon executable instructions adapted to provide a rear window wiper notification, which when provided to a processor and executed thereby, causes the processor to carry out the following:
    when a rear window wiper is in an active state, establish a time duration wherein the time duration is one of a long time duration and a short time duration;
    when a rearview mirror is set to a camera mode, select the short time duration; otherwise, select the long time duration; and
    when the rear window wiper remains in the active state throughout the time duration and after a conclusion of the time duration, provide the rear window wiper notification in an interior cabin of a vehicle.

14. The non-transitory and machine-readable medium of claim 13, wherein:
    a front window wiper is in an inactive state; and
    the time duration is established when both the rear window wiper is in the active state and the front window wiper is in the inactive state.

15. The non-transitory and machine-readable medium of claim 13, further comprising the following:
    when the vehicle has been stationary for a substantial amount of time, modify the time duration.

16. The non-transitory and machine-readable medium of claim 13, further comprising the following:
    sense substantial rainfall on a portion of the vehicle; and
    when substantial rainfall is sensed on the portion of the vehicle, modify the time duration.

17. The non-transitory and machine-readable medium of claim 13, wherein the rear window wiper notification is exhibited on a display of a Driver Information Center (DIC).

* * * * *